US008685250B2

(12) United States Patent
Choi et al.

(10) Patent No.: US 8,685,250 B2
(45) Date of Patent: *Apr. 1, 2014

(54) SYSTEM AND METHOD FOR USING CARBON DIOXIDE SEQUESTERED FROM SEAWATER IN THE REMINERALIZATION OF PROCESS WATER

(75) Inventors: Young Chul Choi, Tampa, FL (US); Chunwoo Lee, Tampa, FL (US); Pranay Mane, Tampa, FL (US)

(73) Assignee: Doosan Heavy Industries & Construction Co., Ltd., Changwon (KR)

(*) Notice: Subject to any disclaimer, the term of this patent is extended or adjusted under 35 U.S.C. 154(b) by 525 days.

This patent is subject to a terminal disclaimer.

(21) Appl. No.: 12/964,217

(22) Filed: Dec. 9, 2010

(65) Prior Publication Data

US 2011/0132840 A1    Jun. 9, 2011

Related U.S. Application Data

(63) Continuation-in-part of application No. PCT/US2010/026289, filed on Mar. 5, 2010, which is a continuation of application No. 12/400,765, filed on Mar. 9, 2009, now Pat. No. 7,771,599.

(51) Int. Cl.
*B01D 15/04* (2006.01)
*C02F 1/44* (2006.01)

(52) U.S. Cl.
USPC ..... 210/638; 210/652; 210/321.6; 210/257.2; 210/644; 210/639; 210/641; 210/642; 210/651; 210/316; 96/6; 95/45; 95/51; 95/156

(58) Field of Classification Search
USPC ......... 210/639, 641, 642, 644, 651, 652, 316, 210/433.1; 95/51, 156
See application file for complete search history.

(56) References Cited

U.S. PATENT DOCUMENTS

| | | |
|---|---|---|
| 4,222,825 A | 9/1980 | Eisden |
| 5,399,261 A | 3/1995 | Martin et al. |
| 5,525,224 A | 6/1996 | Funahashi et al. |
| 5,695,646 A | 12/1997 | Graf |
| 5,833,841 A | 11/1998 | Koslowsky |
| 5,993,737 A | 11/1999 | Mackintosh et al. |
| 6,093,321 A | 7/2000 | Bonnelye et al. |
| 6,572,902 B2 | 6/2003 | Abramowitz et al. |
| 6,863,819 B2 | 3/2005 | Maree |
| 7,374,694 B2 | 5/2008 | Gaudinot et al. |
| 2003/0019818 A1 | 1/2003 | Carson et al. |
| 2004/0104180 A1 | 6/2004 | Gaudinot et al. |
| 2006/0091077 A1 | 5/2006 | Haas et al. |

OTHER PUBLICATIONS

Y. Yamauchi et al., Remineralization of Desalinated Water by Limestone Dissolution Filter, 1987, Desalination, 66, pp. 365-383.
Green Desalination, Carlsbad Project Develops Plan to Mitigate its Carbon Footprint, Nov. 11, 2008, [http://eponline.com/articles/2008/11/11/green-desalination.aspx], accessed Mar. 8, 2010 online, pp. 1-4.
U.S. Army Corps of Engineers, Naval Facilities Engineering Command, Air Force Civil Engineer Support Agency, Unified Facilities Criteria (UFC), Water Desalination, Jan. 16, 2004, pp. 1-118.
H. Zidouri, Desalination in Morocco and Presentation of Design and Operation of the Laayoune Seawater Reverse Osmosis Plant, Desalination, year 2000, 131, pp. 137-145.
Membrana, Liqui-Cel Membrane Contactors, Carbon Dioxide and Water, TechBrief, 2007, pp. 1-2.

*Primary Examiner* — Krishnan S Menon
*Assistant Examiner* — Allison G Fitzsimmons
(74) *Attorney, Agent, or Firm* — Sughrue Mion, PLLC

(57) ABSTRACT

Disclosed is an improved method for remineralizing desalinated water. The desalination system includes, but is not limited to, a conventional reverse osmosis membrane system, forward osmosis membrane system, electro dialysis system, Multi Stage Flash (MSF) system, and Multi Effect Distillation (MED) system.

21 Claims, 16 Drawing Sheets

SYSTEM AND METHOD FOR USING CARBON DIOXIDE SEQUESTERED FROM SEAWATER IN THE REMINERALIZATION OF PROCESS WATER

CROSS-REFERENCE TO RELATED APPLICATION

This application is a continuation in part of and claims the benefit of priority to PCT Application Number PCT/US10/26289, filed on Mar. 5, 2010 and entitled "System and Method for using Carbon Dioxide Sequestered from Seawater in the Remineralization of Process Water", which is a continuation of and claims the benefit of priority to U.S. patent application Ser. No. 12/400,765, filed on Mar. 9, 2009 and entitled "System and Method for using Carbon Dioxide Sequestered from Seawater in the Remineralization of Process Water". The contents of both applications are fully incorporated herein.

BACKGROUND OF THE INVENTION

1. Field of the Invention

This invention relates to the remineralization of process water in a desalination process. More particularly, the present invention relates to using carbon dioxide, or carbon dioxide contained in concentrates called brines, to remineralize desalinated water produced using membrane processes, thermal processes, or other alternative processes.

2. Description of the Background Art

Known desalination systems use reverse osmosis (RO) filters, or thermal energy, or electrical current, to create pure water ($H_2O$) from seawater. Desalinated water by itself, however, is not suitable for human consumption and is highly corrosive to distribution systems, such as pipelines and plumbing. This is because pure processed water has a low carbonate alkalinity and is devoid of key minerals. Thus, known desalination systems require a post-treatment or remineralization process. In this process, minerals, such as calcium and magnesium are added back to the desalinated water along with carbonate alkalinity. This remineralization step adds taste and reduces the corrosive effects of the water.

Known remineralization processes add gaseous carbon dioxide ($CO_2$) and either calcium hydroxide ($Ca(OH)_2$) or calcium carbonate ($CaCO_3$). These react with the water ($H_2O$) to form a soluble calcium bicarbonate($Ca(HCO_3)_2$). Calcium bicarbonate ($Ca(HCO_3)_2$) increases the pH and otherwise adds both alkalinity and hardness to the water. The result is water that is better tasting and less corrosive. Current remineralization techniques deliver the gaseous carbon dioxide ($CO_2$) via commercial suppliers or the on-site burning of fossil fuels. However, commercial carbon dioxide ($CO_2$) supplies can be expensive and can substantially increase the price per gallon of the resulting water. On-site burning of fossil fuels is also not an acceptable alternative due to the creation of damaging green house gases.

Thus, there exists a need in the art for a remineralization process that does not require an external supply of carbon dioxide ($CO_2$). There is also a need in the art for a remineralization process that is more cost effective and that is not damaging to the environment.

The present invention is aimed at fulfilling these needs.

SUMMARY OF THE INVENTION

It is therefore one of the objectives of this invention to enable the remineralization of process water without the need for an external supply of carbon dioxide.

It is a further object of this invention to remineralize process water without having to burn fossil fuels.

It is also one of the objectives of this invention to provide a desalination system wherein the carbon dioxide used for remineralization is sequestered from seawater or waste streams from seawater desalination processes.

It is still yet another object of this invention to reduce scale and inorganic fouling on membranes used in desalination processes.

Yet another object of this invention is to provide an improved method for remineralizing water that has been desalinated by a conventional reverse osmosis membrane system, forward osmosis membrane system, electro-dialysis system, Multi Stage Flash (MSF) system, Multi Effect Distillation (MED), or another desalinating system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to an improved method for remineralizing desalinated water. The desalination system includes, but is not limited to, a conventional reverse osmosis membrane system, forward osmosis membrane system, and electro-dialysis system, Multi Stage Flash system, and Multi Effect Distillation.

In accordance with one embodiment of the method, carbon dioxide gas ($CO_2$) is sequestered from seawater or the concentrate of desalination processes via a gas transfer membrane. The dissolved carbon dioxide gas ($CO_2$) produces carbonate alkalinity and lowers the pH of the process water, and is thereafter used in the production of soluble calcium bicarbonate ($Ca(HCO_3)_2$). The calcium bicarbonate ($Ca(HCO_3)_2$) adds hardness and alkalinity to the desalinated water so as to yield potable water.

Figure 1:
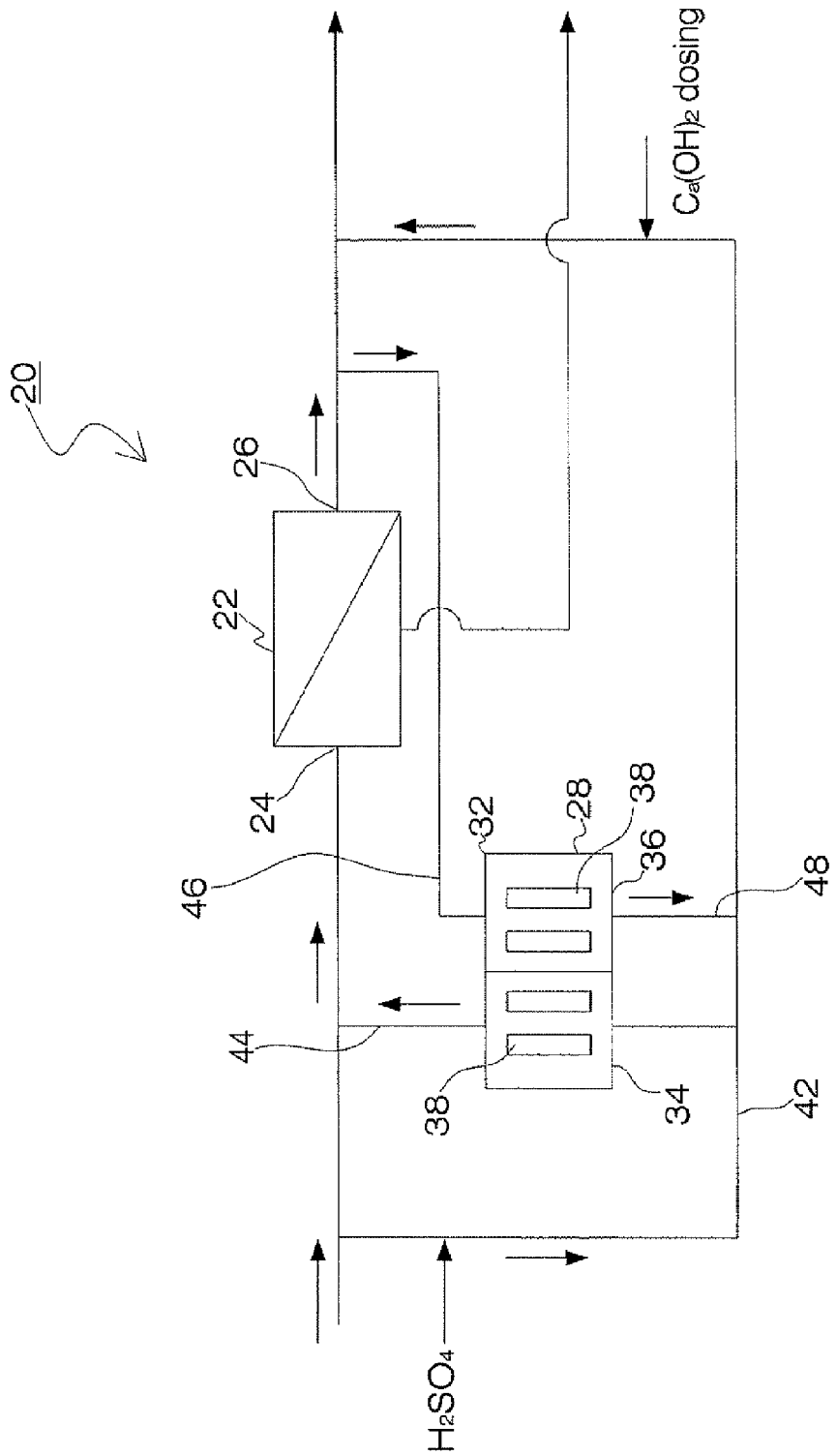
FIG. 1 is a process diagram illustrating the remineralization system of the present invention.

With reference to FIG. 1, a specific embodiment of the method of the present invention is depicted, along with the basic components of a water desalination system 20. The desalination system includes a conventional reverse osmosis (RO) filter 22, including an upstream inlet 24 for seawater and a downstream outlet 26 for the RO permeate.

The present invention further includes a hydrophobic gas transfer apparatus 28. A suitable gas transfer apparatus is sold by Membrana Corporation of Charlotte, N.C. under the trademark Liqui-Cel®. Other suitable hydrophobic gas transferring membranes include, but not limited to, hollow fiber, tubular, and spiral wound types. Those of ordinary skill in the art will appreciate other suitable gas transfer devices after considering the invention. Ideally, the transfer apparatus 28 includes a housing 32 with two counter current flow channels (34 and 36). However, those of ordinary skill in the art will appreciate that co-current flow channels can also be used. These flow channels (34 and 36) are separated by one or more membranes 38. The membranes 38 include pores that are of a sufficient size to allow only the transfer of $CO_2$ gas therethrough. Each flow channel of the membrane has both upstream and downstream ends. That is, the first flow channel 34 has an upstream end 42 and a downstream end 44. Likewise, the second flow channel 36 includes an upstream end 46 and a downstream end 48. As is evident from FIG. 1, seawater, which can be drawn from the ocean, is supplied to the upstream end 42 of first flow channel 34. The second flow channel 36 is coupled to the output of the RO filter 22. Thus, the upstream end 46 of second flow channel 36 is supplied with RO permeate.

In accordance with the preferred method, sulfuric acid ($H_2SO_4$) is added to the seawater. Other acids applicable to lower the pH include, but are not limited to, carbon dioxide ($CO_2$), hydrochloric acid (HCl), and nitric acid ($HNO_3$). These acids convert the bicarbonate in the source water to carbon dioxide gas in accordance with the following equation:

$$\text{acid} + HCO_3 \longrightarrow CO_2 \quad \text{(Eq. 1)}$$

In the embodiment depicted in FIG. 1, sulfuric acid ($H_2SO_4$) is added at the upstream end 42 of the first flow channel 34. The addition of the acid creates an acidified seawater solution. The present invention can also be used in association with a brine solution, in which case the addition of the acid creates an acidified brine solution. Bicarbonate ($HCO_3$—) within the seawater then reacts with the sulfuric acid ($H_2SO_4$) to produce carbon dioxide ($CO_2$) gas. This reaction is carried out in accordance with the following equation:

$$H_2SO_4 + HCO_3 \longrightarrow CO_2 \quad \text{(Eq. 2)}$$

The gaseous carbon dioxide ($CO_2$) created in accordance with either Equations 1 or 2 above and then becomes entrained within the seawater. The seawater and entrained carbon dioxide gas thereafter pass through the first flow channel 34 and encounter membranes 38. As the entrained carbon dioxide gas traverses flow channel 34, it passes through the pores of the membranes 38 and, thereby, passes from the first to the second flow channels (34 and 36). The gaseous carbon dioxide ($CO_2$) is then dissolved within the RO permeate passing through the second flow channel 36. The resulting alkalinity of the RO permeate is thereby increased, ideally to a level that is higher than 50 to 70 milligrams per liter.

In the next step, calcium hydroxide ($Ca(OH)_2$) is added at the downstream end 48 of the second flow channel 36. The sequestered carbon dioxide ($CO_2$), dissolved in the desalinated water, then reacts with the added calcium hydroxide ($Ca(OH)_2$) to produce calcium bicarbonate ($Ca(HCO_3)_2$) in accordance with the following equation:

$$Ca(OH)_2 + CO_2 \rightarrow Ca(HCO_3)_2 \quad \text{(Eq. 3)}$$

The resulting calcium bicarbonate ($Ca(HCO_3)_2$) is then routed to and mixed with the RO permeate. The calcium bicarbonate ($Ca(HCO_3)_2$) adds the necessary hardness and alkalinity to make the water ($H_2O$) potable and non corrosive. Ideally, the alkalinity concentration of the RO permeate should be above 50 to 70 milligrams per liter.

Figure 2:
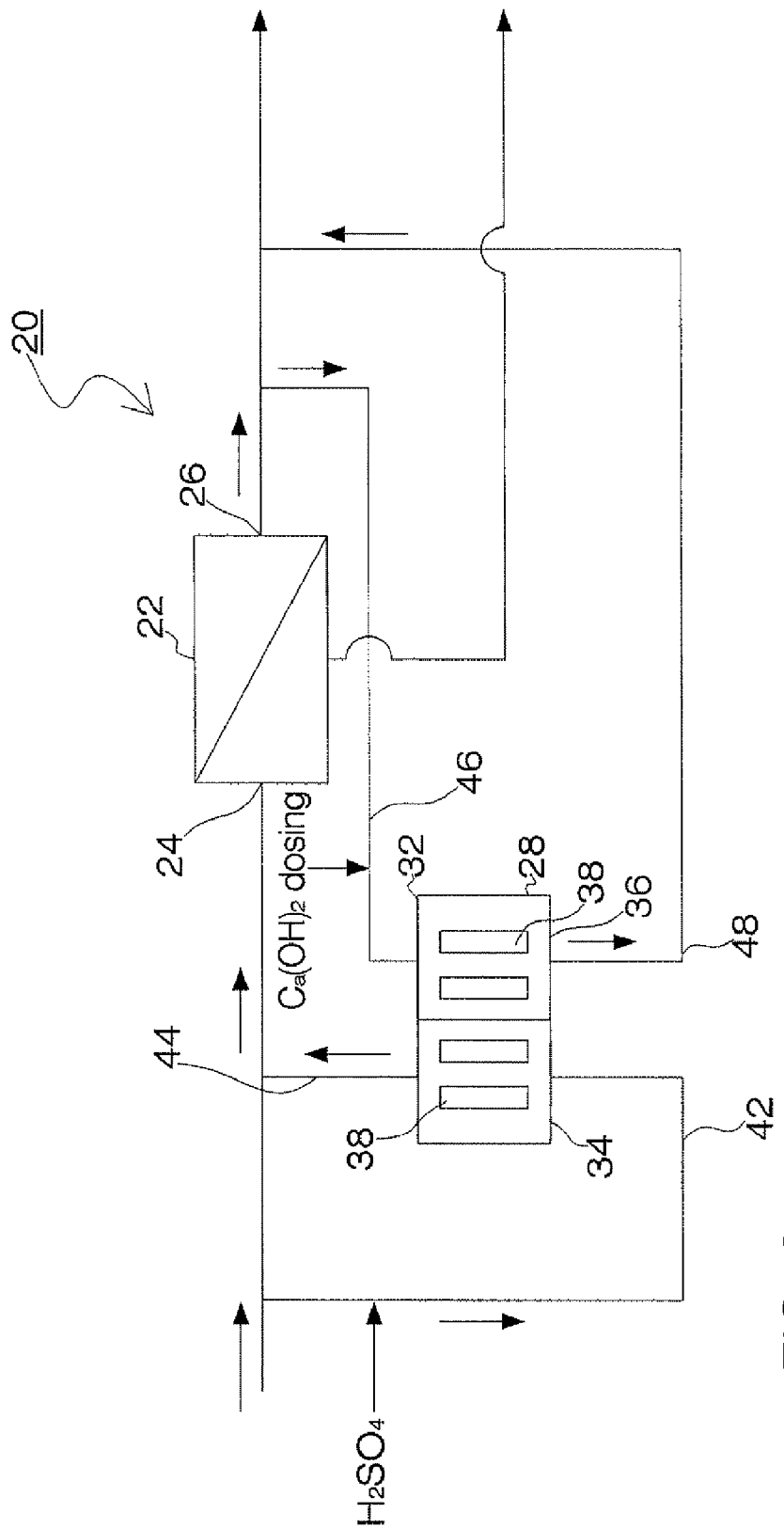
FIG. 2 is a process diagram illustrating an alternative remineralization system of the present invention.
Figure 3:
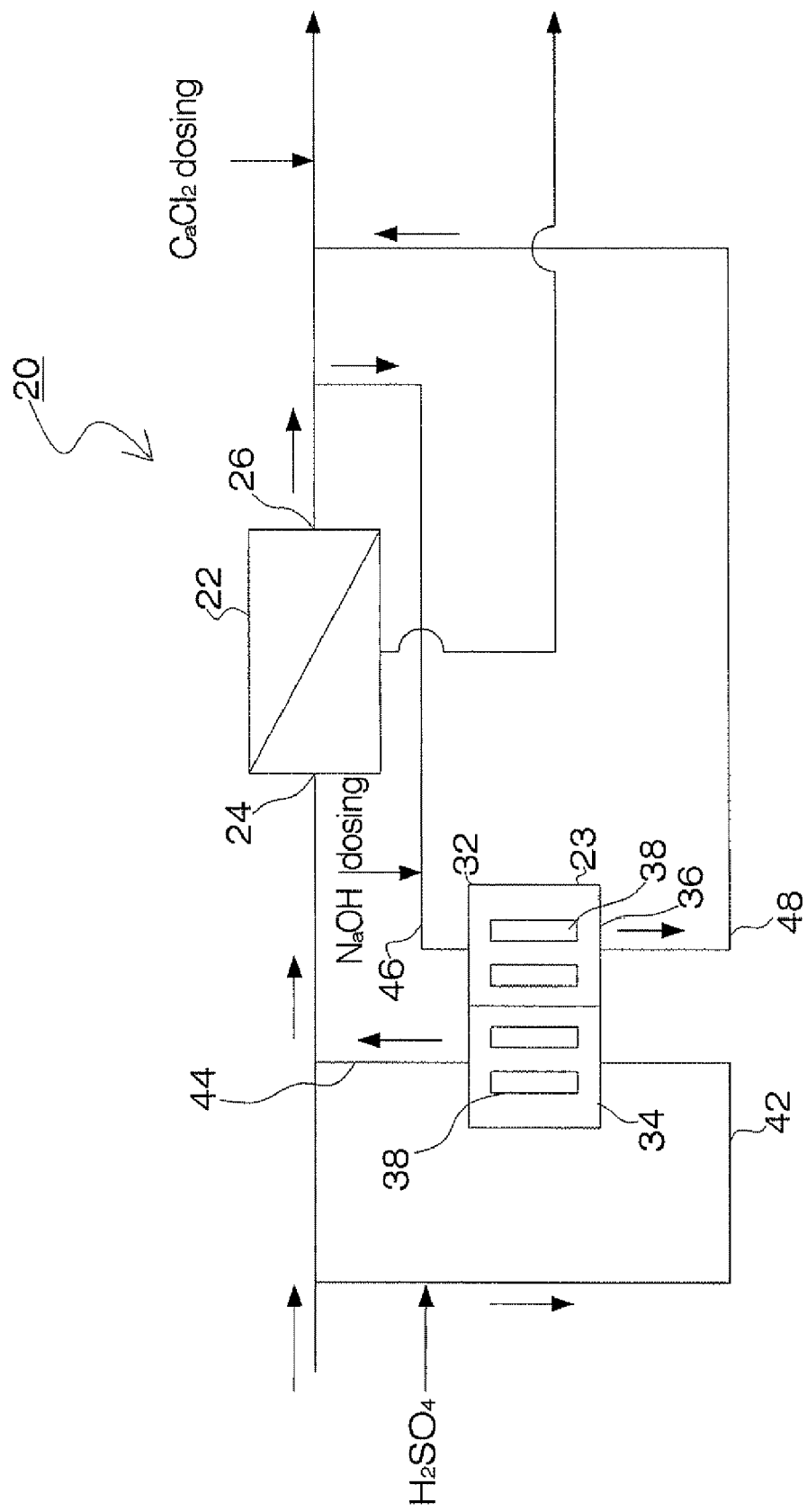
FIG. 3 is a process diagram illustrating an alternative remineralization system of the present invention.

Various alternative embodiments of the present invention are described next. With regard to FIG. 2, applicants have discovered that increasing the pH of the permeate increases the transfer rate of the carbon dioxide ($CO_2$) through membranes 38. Thus, in this embodiment, calcium hydroxide ($Ca(OH)_2$) is added at the upstream end 46 of the second flow channel 36 to thereby increase the pH of the permeate and facilitate greater transfer rates across membranes 38. The system depicted in FIG. 3 is the same in all respects as the system of FIG. 2, however, sodium hydroxide (NaOH) is used in lieu of calcium hydroxide ($Ca(OH)_2$) to increase the pH.

Figure 4:
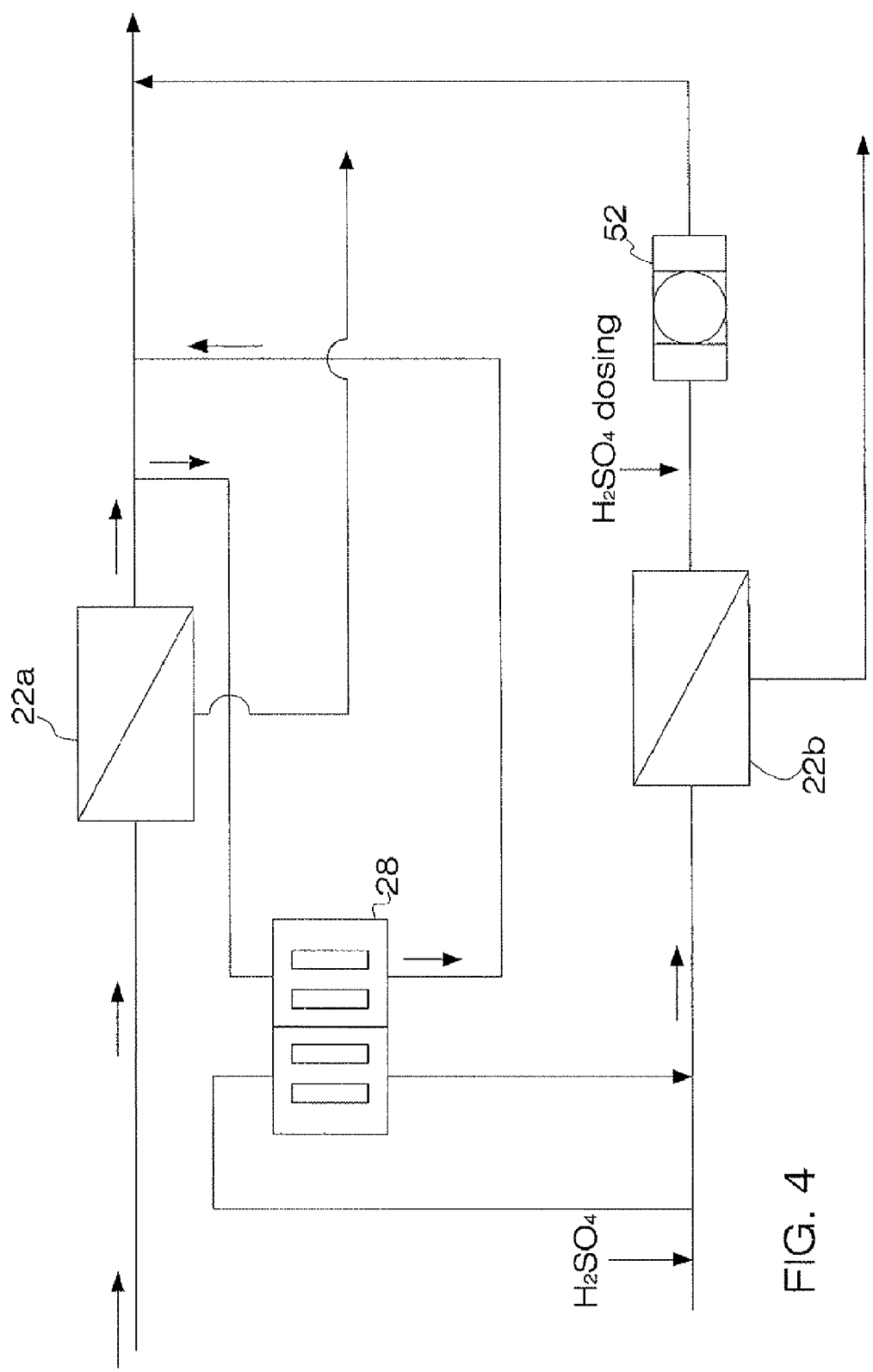
FIG. 4 is a process diagram illustrating an alternative remineralization system of the present invention.

The system depicted in FIG. 4 includes two RO trains (22a and 22b). In this system, the first train 22a produces a high pH RO permeate (i.e. 7.0 to 8.0 pH) and the second train 22b produces a lower pH permeate (i.e. 4.5 to 6.0 pH). The lowered pH seawater and the higher pH RO permeate from the first RO train 22a then pass through the gas transfer assembly 28 wherein carbon dioxide ($CO_2$) is passed from the first the second flow channel (34 and 36). This method further includes a limestone filter 52 for remineralizing the output of the second RO filter 22b. Limestone is known as a means for remineralization and can be used to supplement the remineralization provided by the present system.

Figure 5:
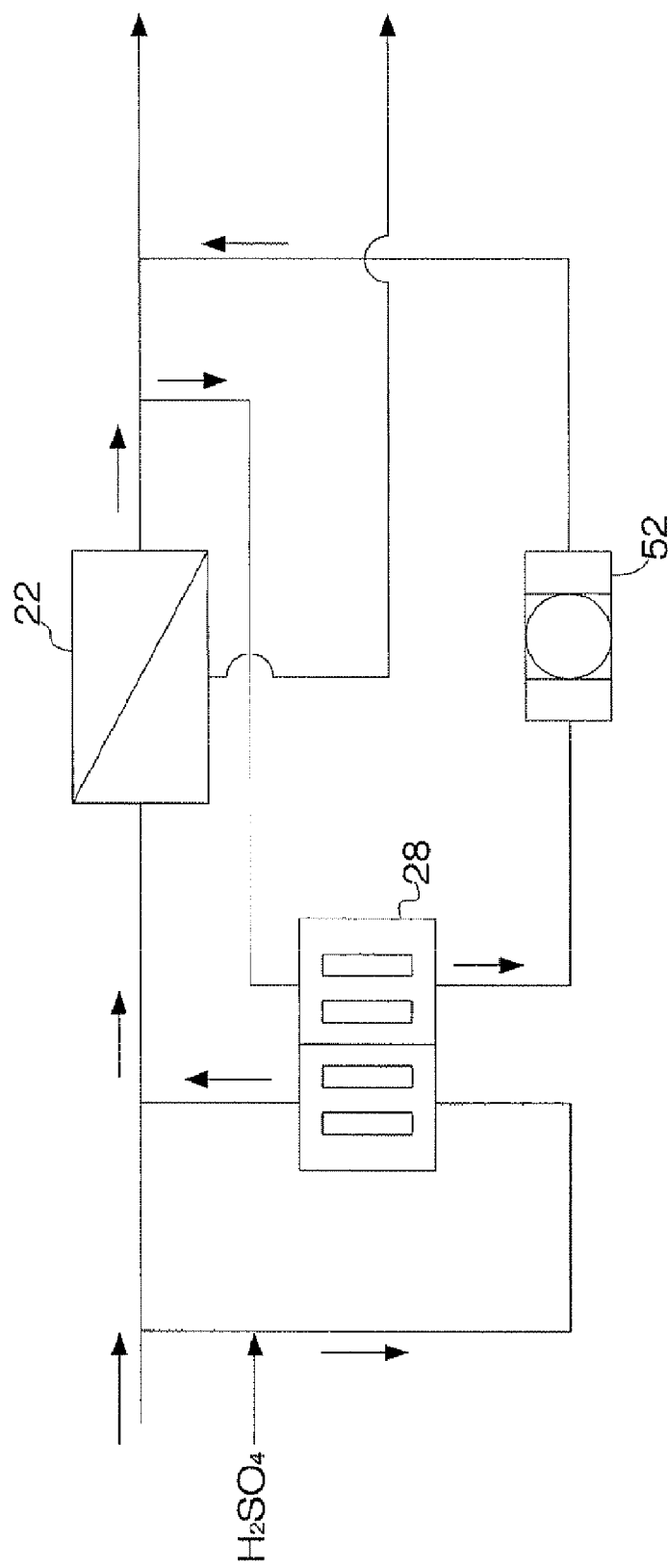
FIG. 5 is a process diagram illustrating an alternative remineralization system of the present invention.
Figure 6:
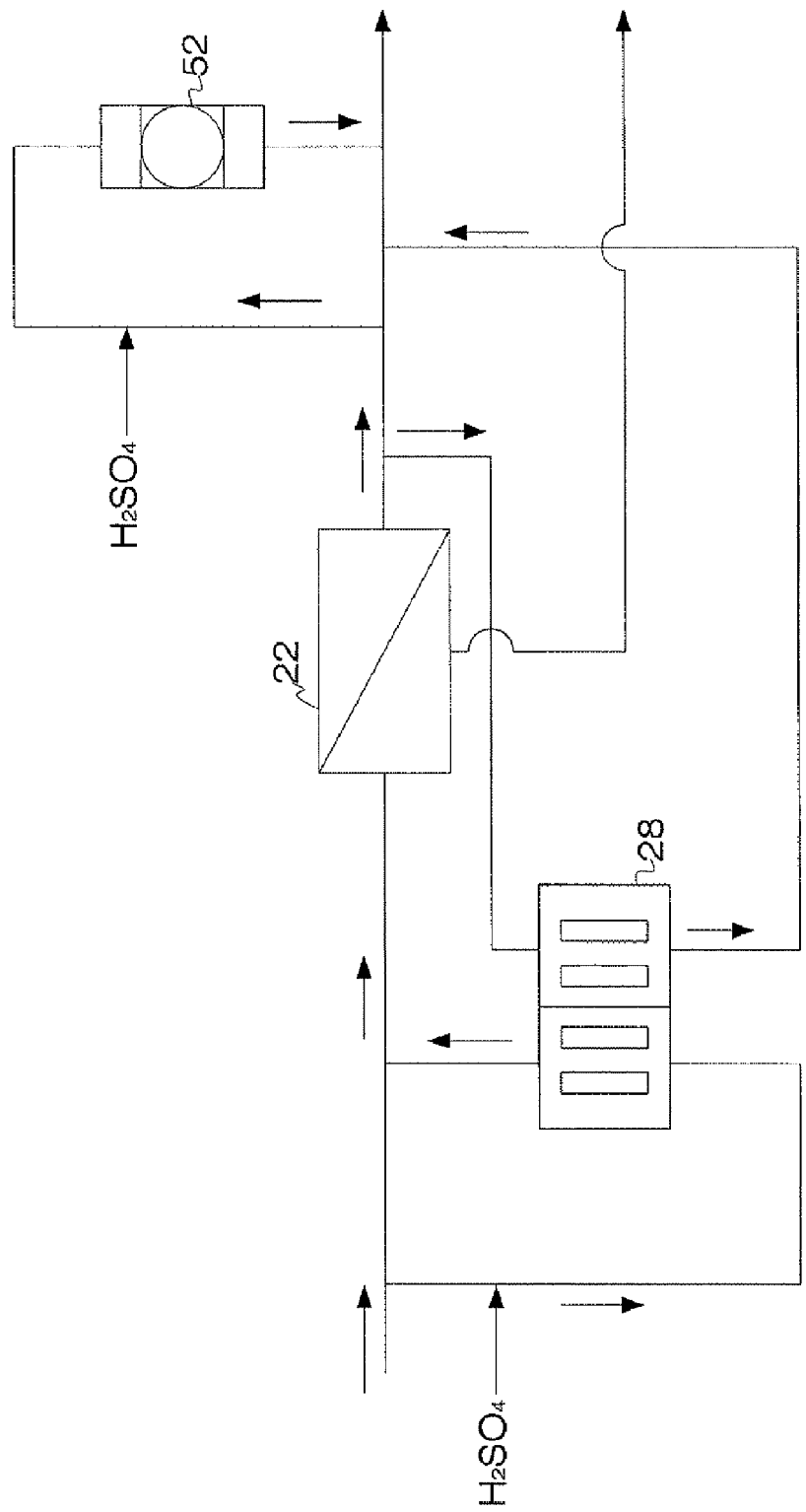
FIG. 6 is a process diagram illustrating an alternative remineralization system of the present invention.

FIGS. 5 and 6 are further examples of systems wherein further remineralization is carried out via a limestone filter. Namely, in FIG. 5, limestone filter 52 is positioned at the downstream end 48 of second flow channel 36. In FIG. 6, the limestone filter 52 is included at the output of RO filter 22.

Additionally in FIG. 6 the pH of the permeate is lowered prior to passage through the limestone filter 52.

FIGS. 7-10 illustrate still further alternative embodiments of the present invention. In these alternative embodiments, carbon dioxide ($CO_2$) is sequestered from brine as opposed to seawater. Namely, in each of the disclosed embodiments, the inlet to the first flow channel 34 is coupled to the brine outlet of the RO filter 22. As in the primary embodiment, sulfuric acid ($H_2SO_4$) is added to produce carbon dioxide ($CO_2$) in accordance with Equation 2 above. However, in the case of the embodiments depicted in FIGS. 7-10, the bicarbonate ($HCO_2$.—) necessary for the reaction is found in the brine 22 and not seawater.

Figure 7:
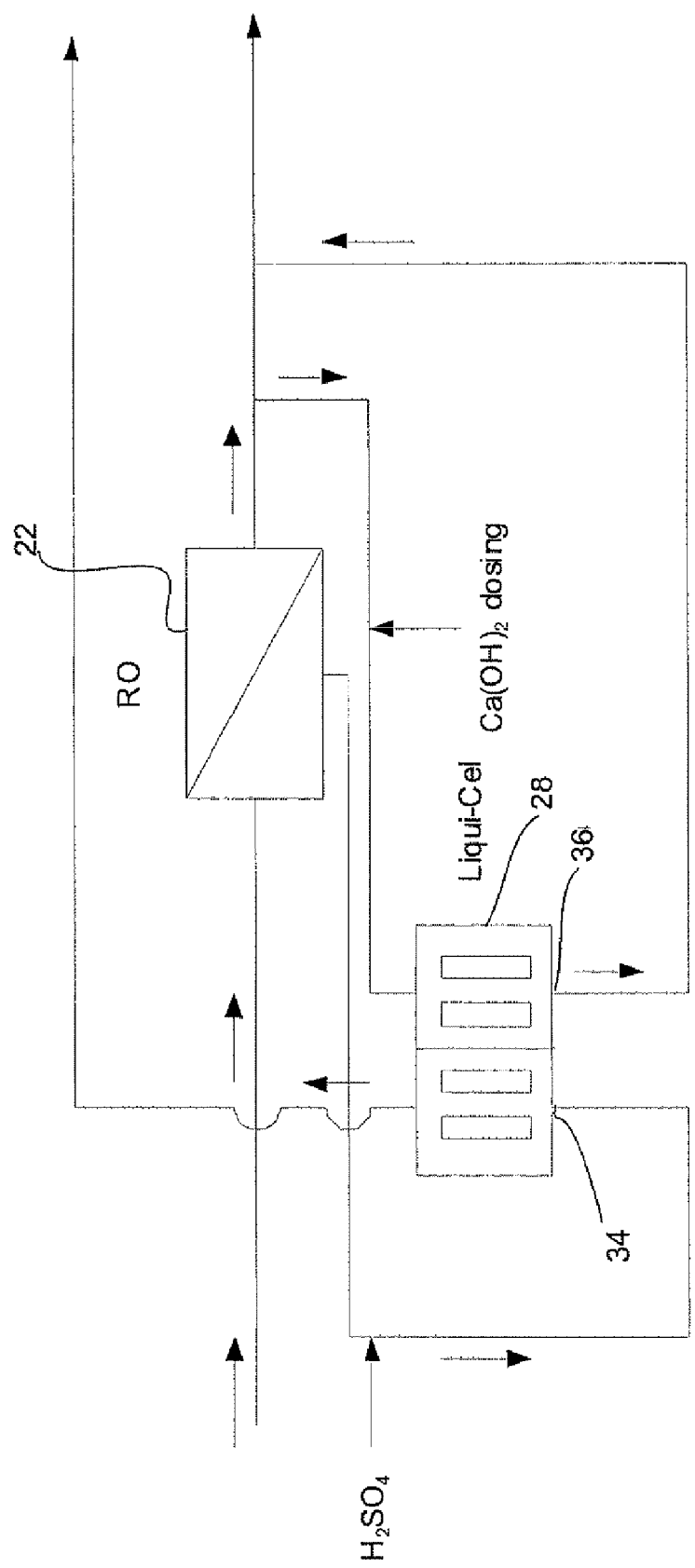
FIG. 7 is a process diagram illustrating an alternative embodiment wherein carbon dioxide ($CO_2$) is sequestered from brine.
Figure 8:
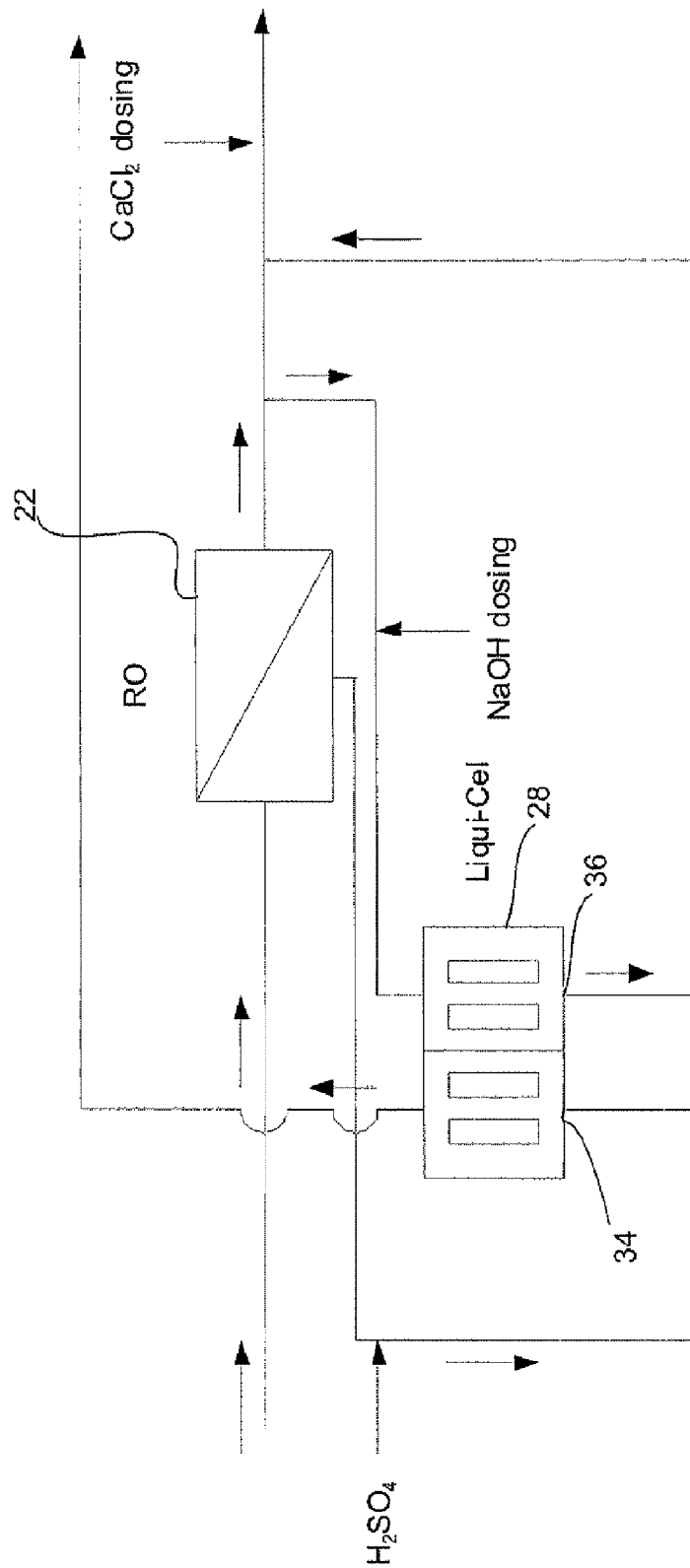
FIG. 8 is a process diagram illustrating an alternative embodiment wherein carbon dioxide ($CO_2$) is sequestered from brine.
Figure 9:
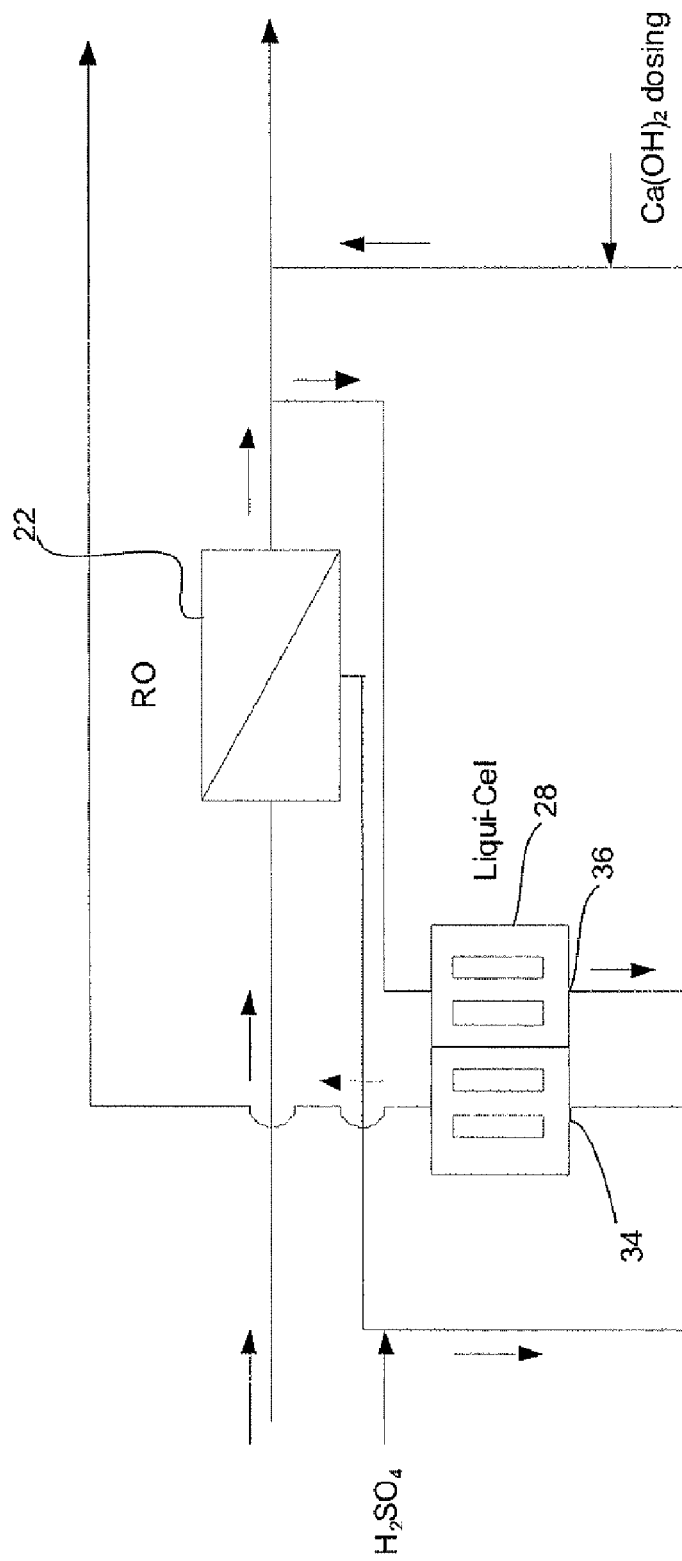
FIG. 9 is a process diagram illustrating an alternative embodiment wherein carbon dioxide ($CO_2$) is sequestered from brine.
Figure 10:
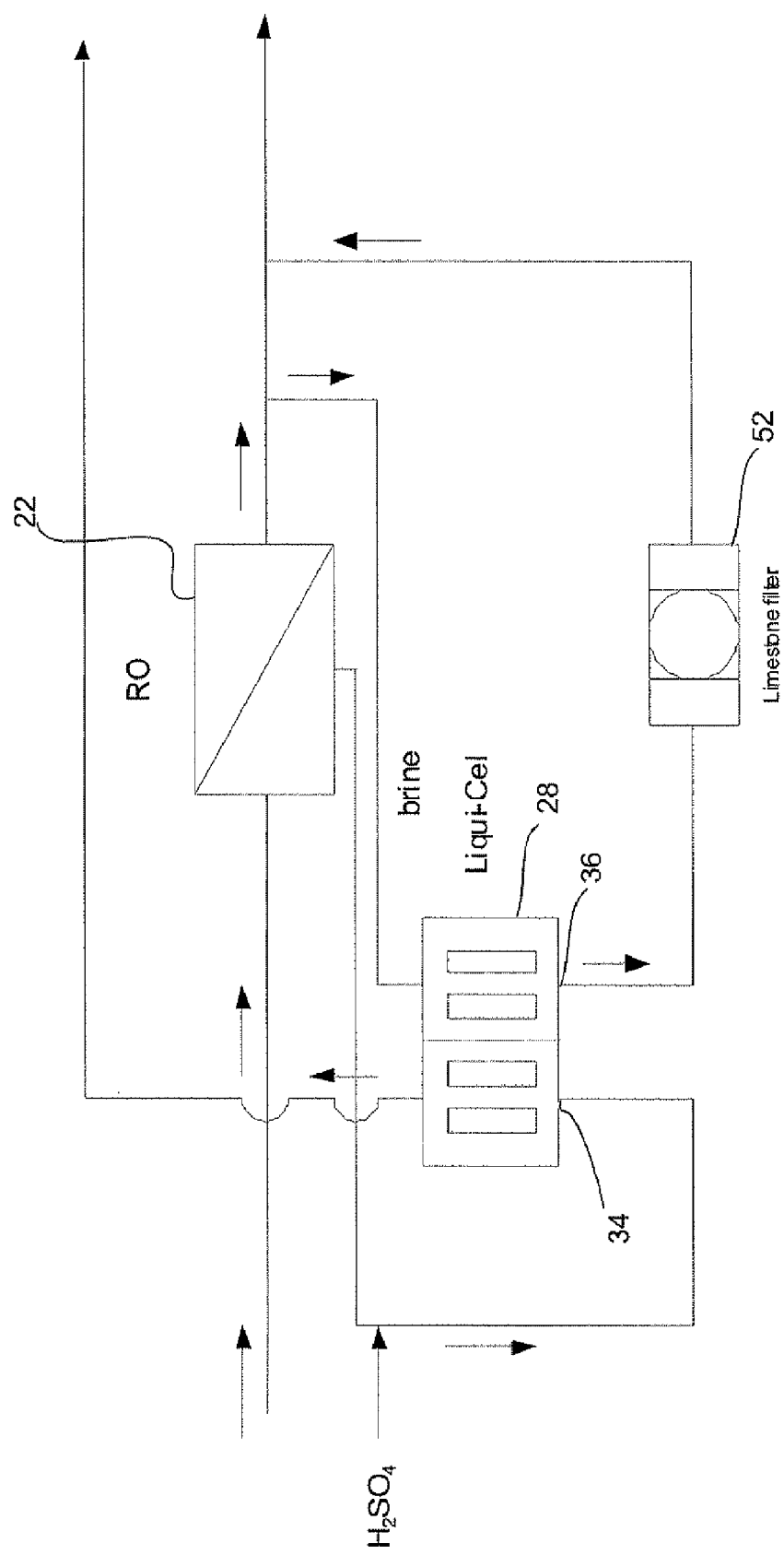
FIG. 10 is a process diagram illustrating an alternative embodiment wherein carbon dioxide ($CO_2$) is sequestered from brine.

In the embodiment of FIG. 7, calcium hydroxide ($Ca(OH)_2$) is added to the upstream side of second flow channel 36 to thereby increase the pH of the permeate and, thereby, increase the transfer rate of the carbon dioxide ($CO_2$) through the gas transfer membranes. The embodiment of FIG. 8 is the same in all respects to the embodiment of FIG. 7, however, sodium hydroxide (NaOH) is used in lieu of calcium hydroxide ($Ca(OH)_2$). In the embodiment of FIG. 9, the calcium hydroxide ($Ca(OH)_2$) dosing is accomplished downstream of the second flow channel. Finally, in the embodiment of FIG. 10, a limestone filter 52 is used in place of calcium hydroxide ($Ca(OH)_2$) dosing.

Additional embodiments of the present method are disclosed in connection with FIGS. 11-16.

Figure 11:
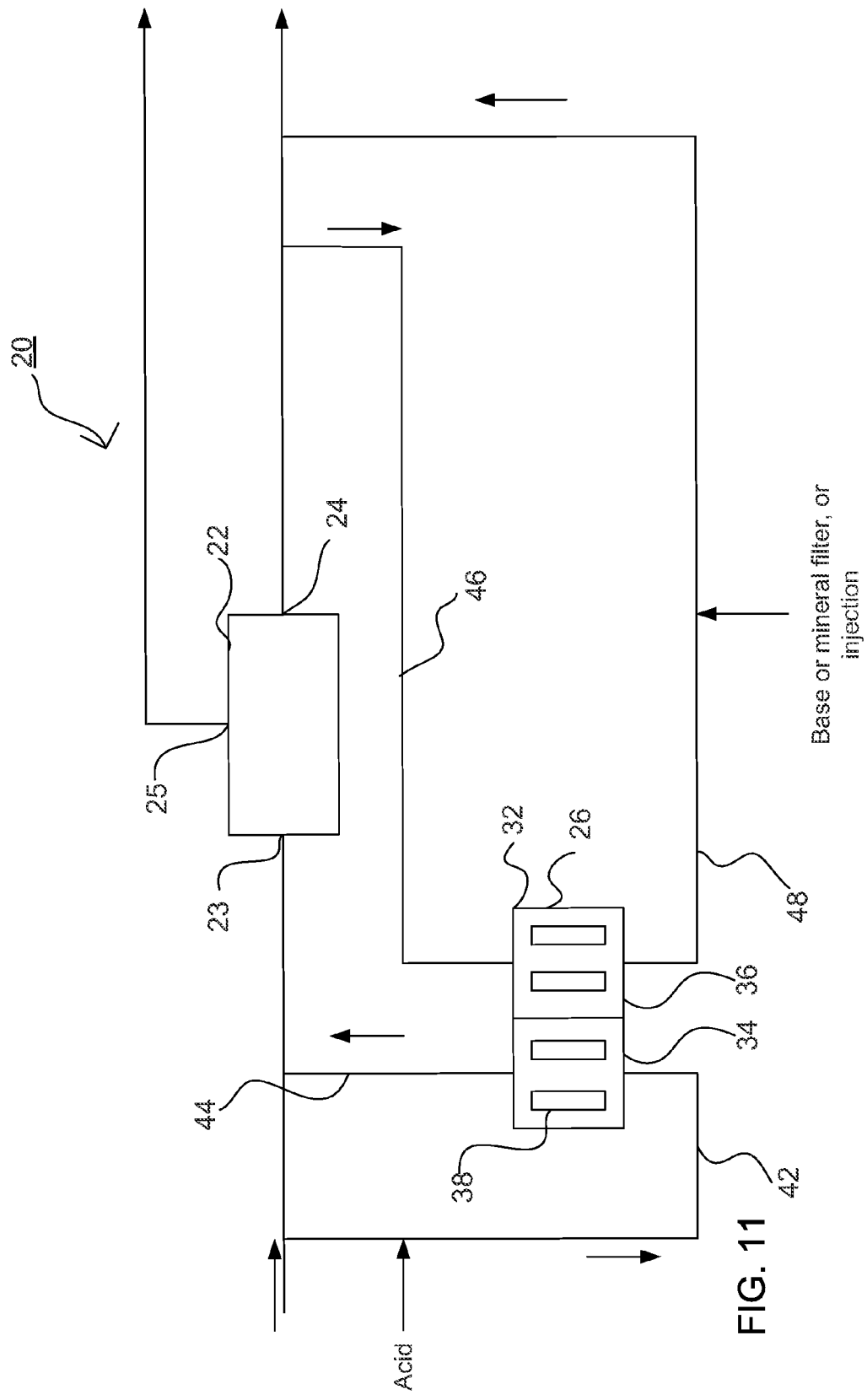
FIG. 11 is a process diagram illustrating an alternative remineralization system of the present invention.
Figure 12:
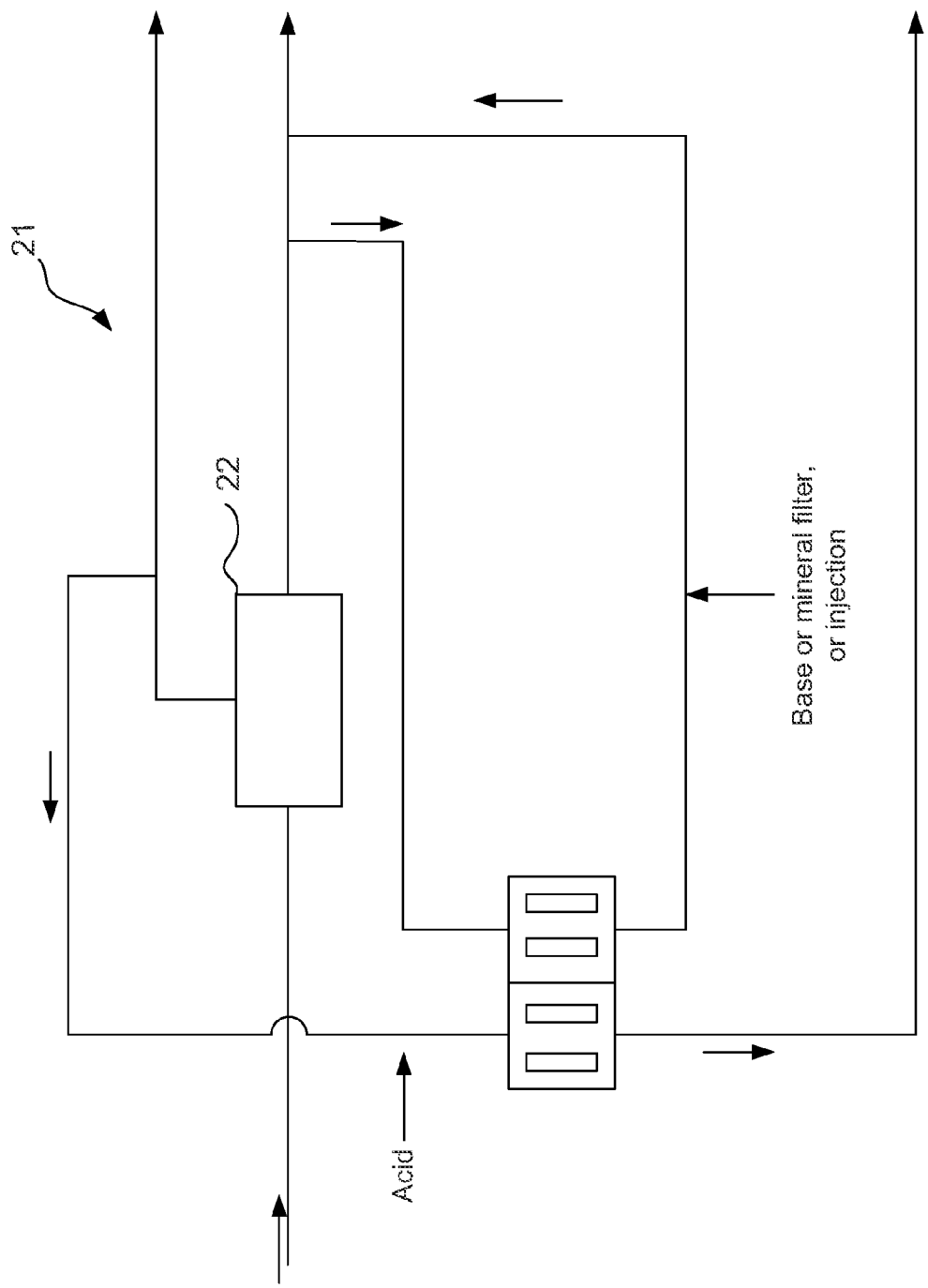
FIG. 12 is a process diagram illustrating an alternative remineralization system of the present invention.

FIGS. 11-12 illustrate further alternative embodiments of the present invention that use non-specific desalination systems 22 (as opposed to the RO filters disclosed in the previous embodiments). In these embodiments, carbon dioxide ($CO_2$) is sequestered from either seawater, or desalination system concentrate, and transferred to the desalinated water. In each of the disclosed embodiments, the inlet to the first feed flow channel 34 is either coupled to the concentrate outlet of the desalination system or a seawater source. As in the primary embodiment, sulfuric acid ($H_2SO_4$) can be added to produce carbon dioxide in accordance with Equation 2 above. Additionally, calcium hydroxide ($Ca(OH)_2$) can be added to increase the hardness in accordance with Equation 3 above. For these embodiments, carbon dioxide production can also be achieved via the addition of any other suitable acid in accordance with Equation 1 above.

The added acid ideally is sufficient to lower the pH of the seawater. Furthermore, the hardness addition described above can be achieved via any other suitable base or mineral filter or injection, respectively. The base or mineral used should be sufficient to convert dissolved carbon dioxide ($CO_2$) to bicarbonate ($HCO_3$—). The bases that can be added to the downstream end of the second flow channel include, but are not limited to, sodium hydroxide (NaOH), potassium hydroxide (KOH), calcium hydroxide ($Ca(OH)_2$), and magnesium hydroxide ($Mg(OH)_2$). The base can be injected or added via a base filter. Potential equations for the addition of a mineral or base include but are not limited to the following:

$$\text{base} + CO_2 \rightarrow HCO_3^- + \text{mineral} \quad \text{(Eq. 5)}$$

$$\text{base} + CO_2 \rightarrow HCO_3^- \quad \text{(Eq. 6)}$$

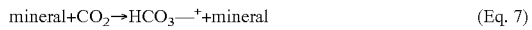

$$\text{mineral} + CO_2 \rightarrow HCO_3^- + \text{mineral} \quad \text{(Eq. 7)}$$

$$CO_2 + OH^- \rightarrow HCO_3^- \quad \text{(Eq. 8)}$$

The mineral added to the downstream end of the second flow channel can be calcium or calcium and magnesium containing minerals, including but not limited to, calcium carbonate ($CaCO_3$), calcium bicarbonate ($Ca(HCO_3)_2$), calcium hydroxide ($Ca(OH)_2$), calcium oxide (CaO), magnesium carbonate ($MgCO_3$), magnesium oxide (MgO), and dolomite ($CaMg(CO_3)_2$).

Figure 13:
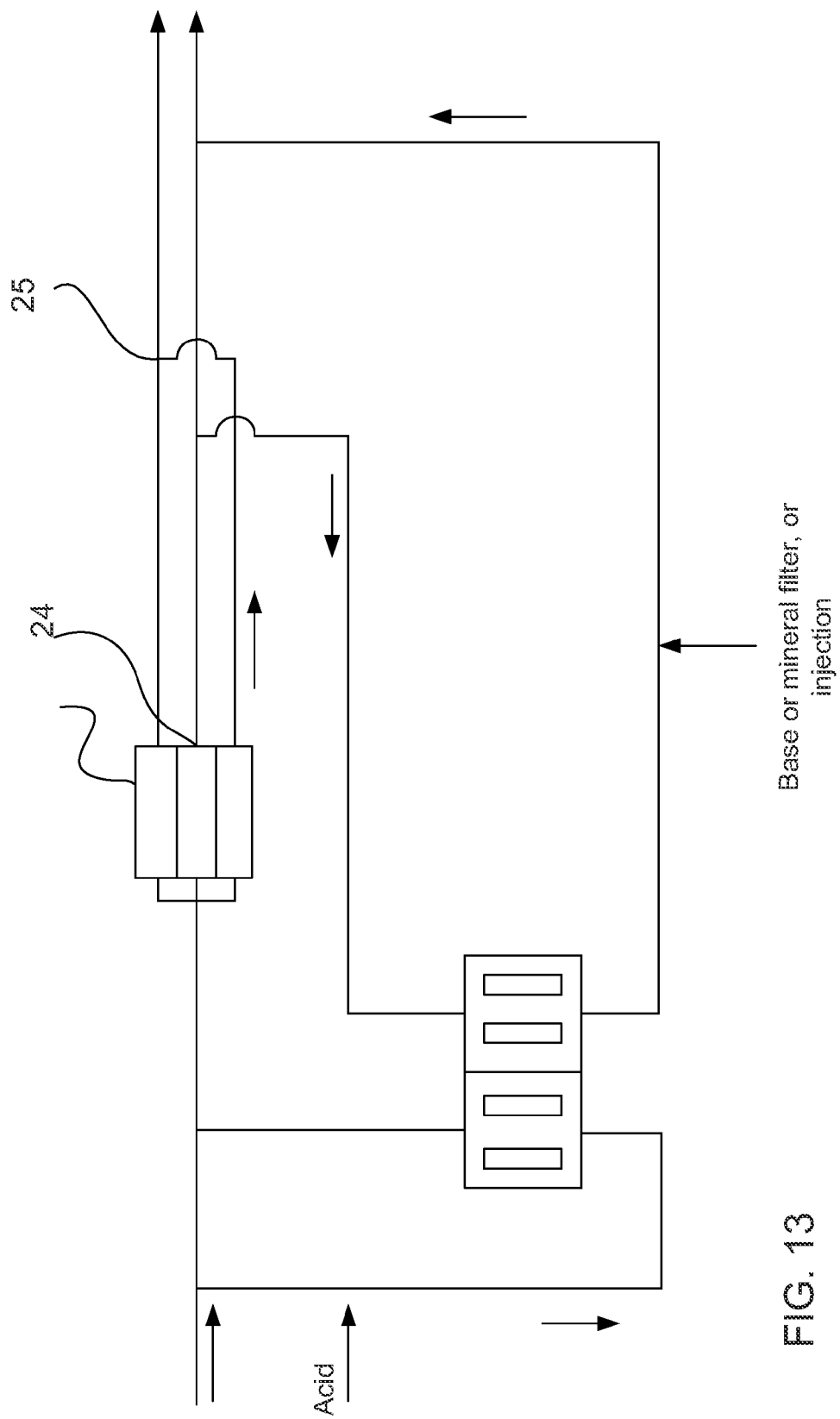
FIG. 13 is a process diagram illustrating an alternative remineralization system of the present invention.
Figure 14:
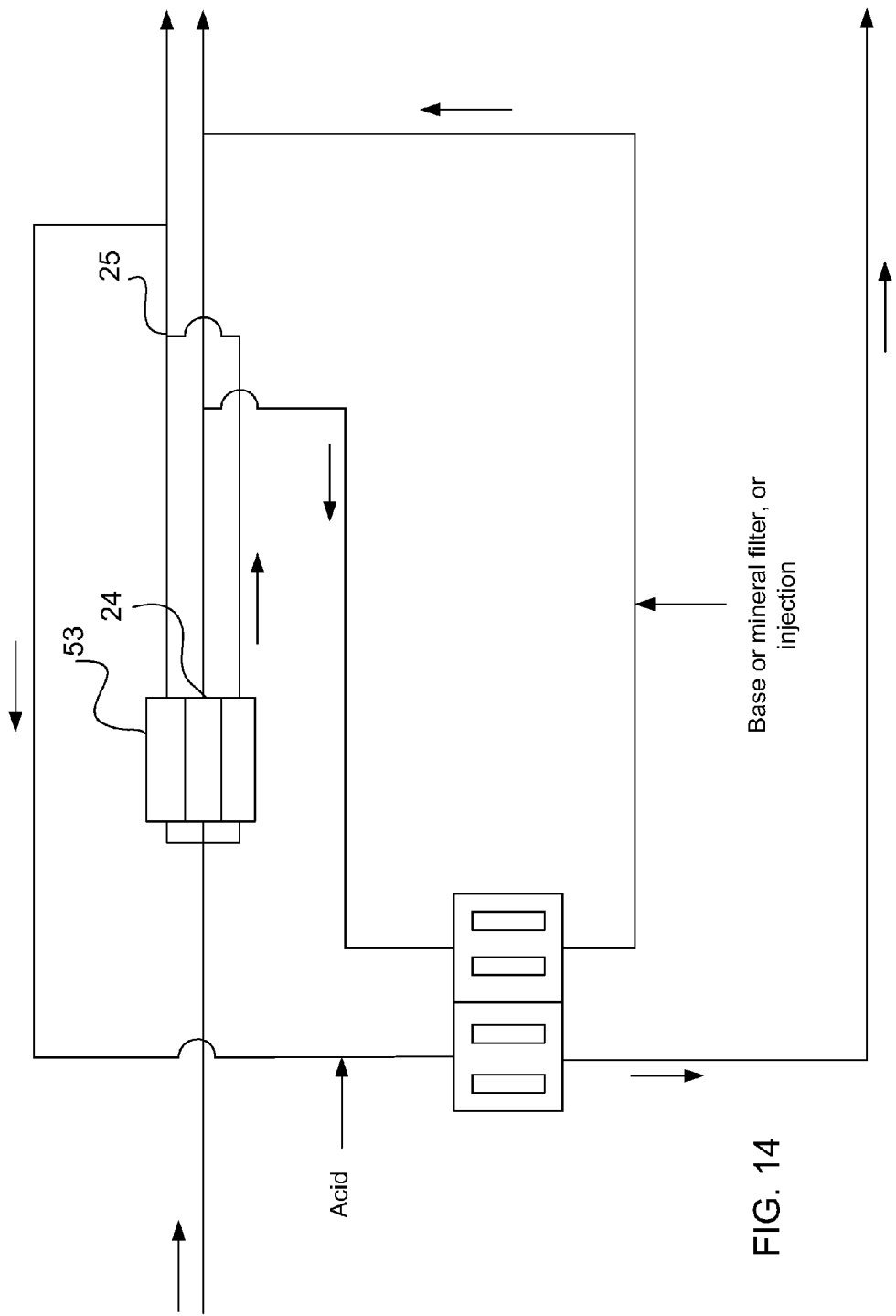
FIG. 14 is a process diagram illustrating an alternative remineralization system of the present invention.

FIGS. 13-14 illustrate further alternative embodiments of the present invention. These embodiments are similar to the previously disclosed embodiments. However, these systems use an electrodialysis system 53 instead of an RO filter or the general desalination system presented in FIGS. 11 and 12. In each case, carbon dioxide production is achieved via the addition of a suitable acid, and hardness addition is achieved via any other suitable base, mineral filter, or injection, respectively. In these embodiments, carbon dioxide ($CO_2$) is sequestered from either seawater or Electrodialysis system concentrate, and transferred to the desalinated water as described above.

Figure 15:
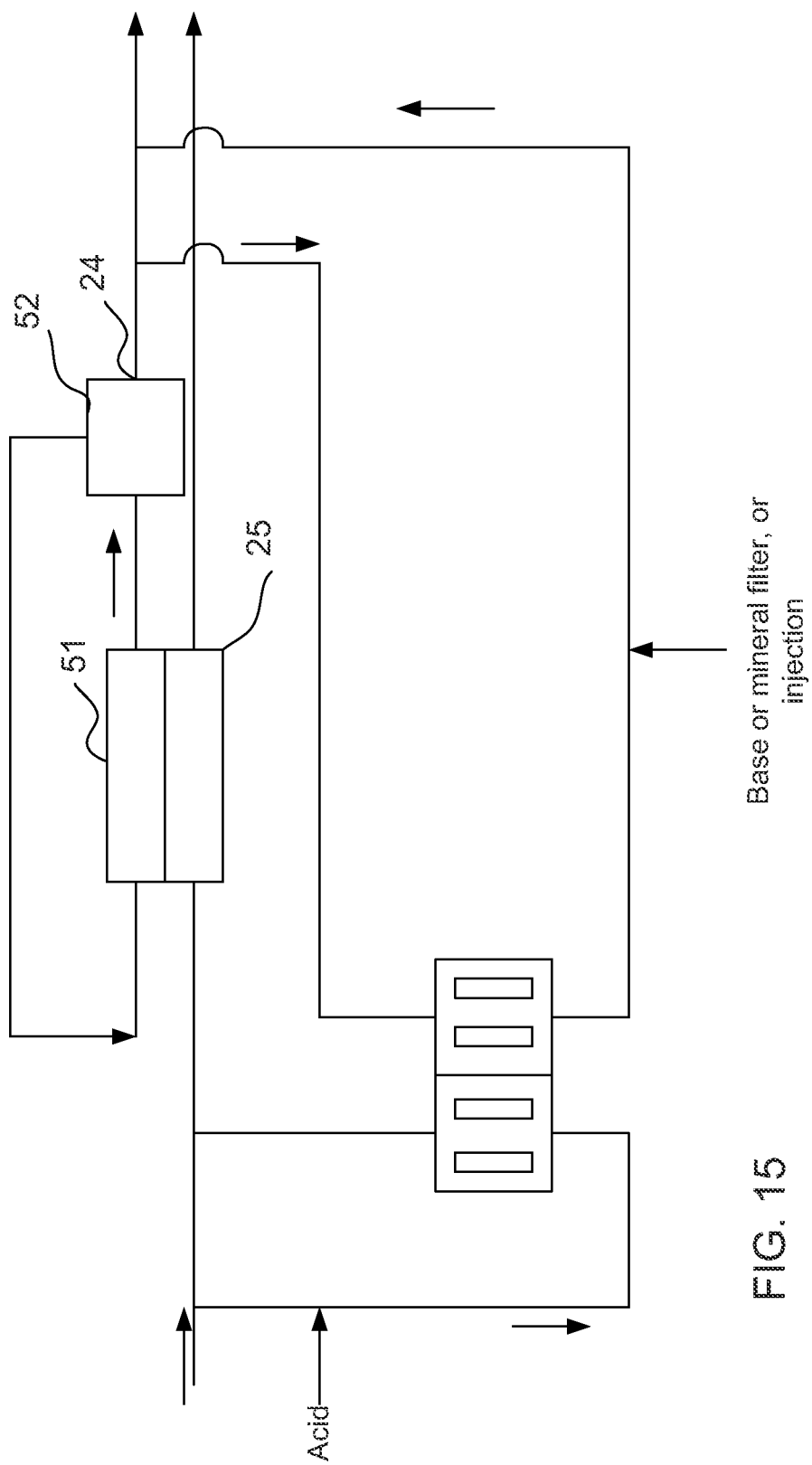
FIG. 15 is a process diagram illustrating an alternative remineralization system of the present invention.
Figure 16:
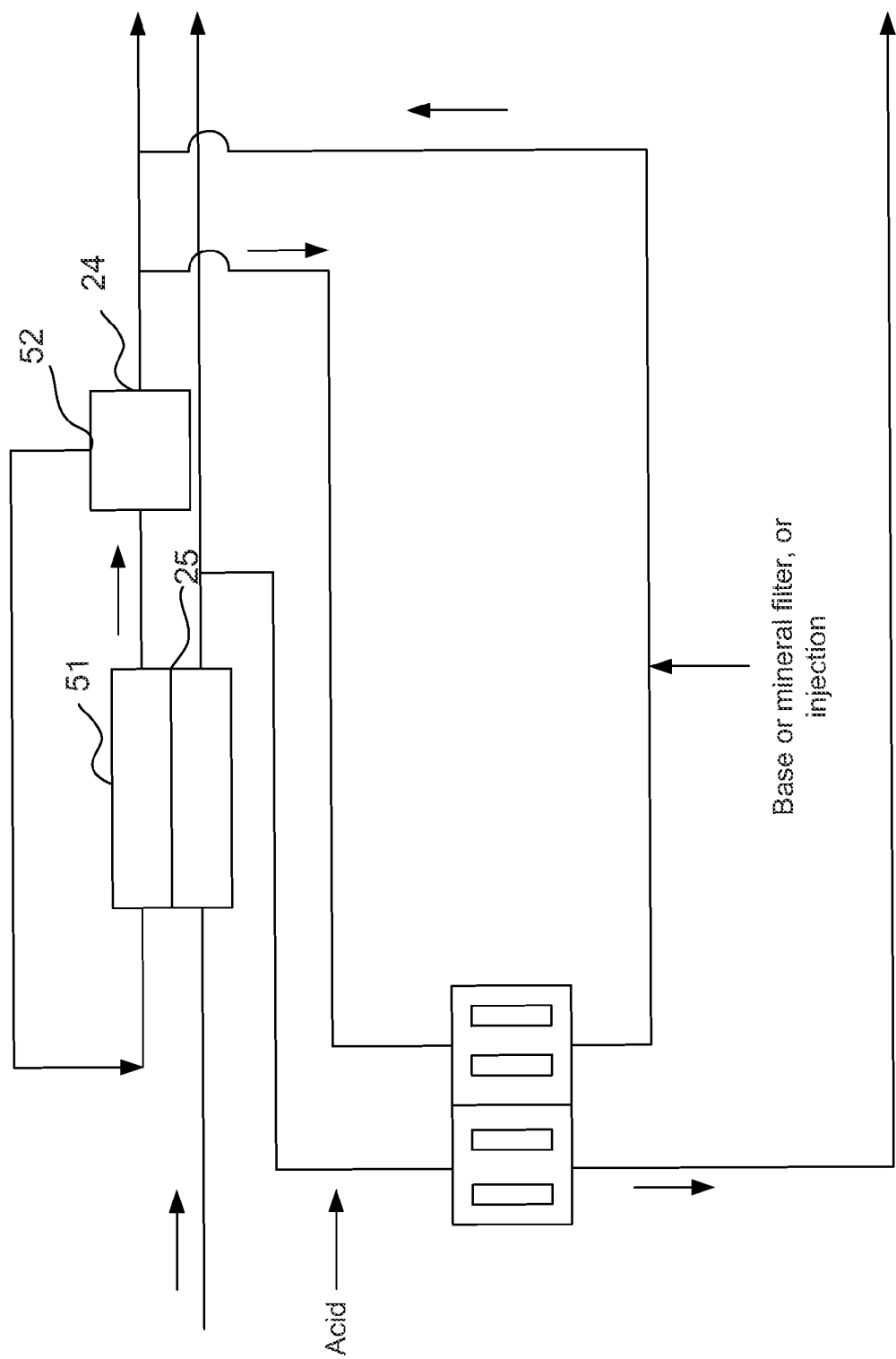
FIG. 16 is a process diagram illustrating an alternative remineralization system of the present invention.

FIGS. 15-16 illustrate further alternative embodiments of the present invention. These embodiments are similar to the previously disclosed embodiments. However, these systems use a forward osmosis system 51 instead of an RO filter or the general desalination system presented in FIGS. 11 and 12. In each case, carbon dioxide production is achieved via the addition of a suitable acid, and hardness addition is achieved via any other suitable base, mineral filter, or injection, respectively. In these embodiments, carbon dioxide ($CO_2$) is sequestered from either seawater or Forward Osmosis system concentrate, and transferred to the desalinated water.

Still yet other alternatives for the desalination system can be used. Potential desalination systems include, but are not limited to, reverse osmosis membrane systems, forward osmosis membrane systems, electro dialysis systems, Multi Stage Flash (MSF) systems, and Multi Effect Distillation (MED) systems. In sum, any desalination system can be employed provided it produces desalinated or fresh water and concentrate waste stream from seawater.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. Now that the invention has been described,

What is claimed is:

1. A method for remineralizing process water in a seawater desalination plant, seawater used in the plant containing bicarbonate, the method comprising the following steps:

providing a desalination system including an upstream inlet for the seawater and downstream outlets for desalinated water and concentrate;

providing a gas transfer membrane, the membrane including first and second flow channels, each flow channel having upstream and downstream ends, a portion of the seawater being supplied to the first flow channel and the desalinated water being supplied to the second flow channel, the portion of the seawater serving as a source of carbon dioxide (CO2) and the desalinated water serving as a recipient of the carbon dioxide (CO2);

adding acid to the upstream end of the first flow channel to convert the bicarbonate in the portion of the seawater to carbon dioxide (CO2) in accordance with the following equation:

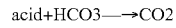

acid+HCO3—→CO2 passing the carbon dioxide (CO2) gas through the gas transfer membrane, whereby the carbon dioxide (CO2) gas is sequestered from the first to the second channel and is dissolved in the desalinated water.

2. The method as described in claim 1 wherein the desalination system is selected from one of the following: reverse osmosis membrane system, forward osmosis membrane system, electro dialysis system, Multi Stage Flash (MSF) system, and Multi Effect Distillation (MED) system.

3. The method as described in claim 1 wherein the desalination system is any system that produces desalinated or fresh water and concentrate waste stream from seawater.

4. The method as described in claim 1 comprising the additional step of:

adding base to the downstream end of the second flow channel, wherein the sequestered carbon dioxide (CO2) dissolved in desalinated water reacts with the added base to produce bicarbonate (HCO3—) in accordance with the following equation:

base+CO2→HCO3—+mineral the produced bicarbonate (HCO3—) and mineral being added to the desalinated water thereby adds hardness and alkalinity to the resulting water (H2O).

5. The method as described in claim 4 wherein the added base produces bicarbonate in accordance with the following equation:

base+CO2→HCO3— and wherein the necessary minerals are added further downstream via a separate process.

6. The method as described in claim 4 wherein a mineral is added to the downstream end of the second flow channel instead of a base, in accordance with the following equation:

mineral+CO2→HCO3—++mineral.

7. The method as described in claim 1 comprising the additional step of:

adding base to the upstream end of the second flow channel, wherein the added base reacts with the sequestered carbon dioxide (CO2) dissolved in desalinated water to produce bicarbonate (HCO3—) in accordance with the following equation:

base+CO2→HCO3— the produced bicarbonate (HCO3—) being added to the desalinated water thereby adds hardness and alkalinity to the resulting water (H2O).

8. The method as described in claim 1 wherein the gas transfer membrane is a hydrophobic gas transferring membrane.

9. The method as described in claim 8 wherein the hydrophobic gas transferring membranes are selected from the group consisting of hollow fiber, tubular, and spiral wound types.

10. The method for remineralizing process water as described in claim 1 wherein the concentrate serves as a source of carbon dioxide (CO2), the concentrate provided to the first flow channel of the gas transfer membrane.

11. The method as described in claim 1 wherein the acid added to the upstream end of the first flow channel is selected from the group of acids consisting of: sulfuric acid (H2SO4), carbon dioxide (CO2), hydrochloric acid (HCl), and nitric acid (HNO3).

12. The method as described in claim 1 wherein the acid added to the upstream end of the first flow channel is any acid that can convert the bicarbonate in carbon dioxide (CO2) source water to carbon dioxide gas in accordance with following equation:

acid+HCO3—→CO2.

13. The method as described in claim 4 wherein the base added to the downstream end of the second flow channel is selected from the group of bases consisting of: sodium hydroxide (NaOH), potassium hydroxide (KOH), calcium hydroxide (Ca(OH)2), magnesium hydroxide (Mg(OH)2).

14. The method as described in claim 4 wherein the base added to the downstream end of the second flow channel is any base that can convert dissolved carbon dioxide (CO2) to bicarbonate (HCO3—) in accordance with the following equation:

CO2+base→HCO3—.

15. The method as described in claim 14 wherein the base is injected or added via a base filter.

16. The method as described in claim 7 wherein the base added to the upstream end of the second flow channel is selected from the group of bases consisting of sodium hydroxide (NaOH), potassium hydroxide (KOH), calcium hydroxide (Ca(OH)2), and magnesium hydroxide (Mg(OH)2).

17. The method as described in claim 7 wherein the base added to the upstream end of the second flow channel is any base that can convert dissolved carbon dioxide (CO2) to bicarbonate (HCO3—) in accordance with the following equation:

CO2+OH—→HCO3—.

18. The method as described in claim 17 wherein the base is injected or added via a base filter.

19. The method as described in claim 7 wherein the mineral added to the downstream end of the second flow channel is a calcium containing mineral.

20. The method as described in claim 6 wherein the mineral added to the downstream end of the second flow channel is selected from the group of minerals consisting of calcium oxide (CaO), calcium hydroxide (Ca(OH)2), calcium carbonate (CaCO3), calcium bicarbonate (Ca(HCO3)2), magnesium carbonate (MgCO3), magnesium oxide (MgO), and dolomite (CaMg(CO3)2).

21. A method for remineralizing process water in a seawater desalination plant, seawater used in the plant containing bicarbonate, the method comprising the following steps:

providing a desalination system including an upstream inlet for the seawater and downstream outlets for desalinated water and concentrate;

providing a gas transfer membrane, the membrane including first and second flow channels, each flow channel having upstream and downstream ends, the concentrate being supplied to the first flow channel and the desalinated water being supplied to the second flow channel, the concentrate serving as a source of carbon dioxide (CO2) and the desalinated water serving as a recipient of the carbon dioxide (CO2);

adding acid to the upstream end of the first flow channel to convert bicarbonate in the concentrate to carbon dioxide (CO2) in accordance with the following equation:

acid+HCO3—→CO2 passing the carbon dioxide (CO2) gas through the gas transfer membrane, whereby the carbon dioxide (CO2) gas is sequestered from the first to the second channel and is dissolved in the desalinated water.

* * * * *